(12) United States Patent
Mu (10) Patent No.: US 12,457,606 B2
(45) Date of Patent: Oct. 28, 2025

(54) METHOD FOR TRANSMITTING DCI, COMMUNICATION DEVICE AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 589 days.

(21) Appl. No.: 17/773,822

(22) PCT Filed: Nov. 4, 2019

(86) PCT No.: PCT/CN2019/115405
§ 371 (c)(1),
(2) Date: May 2, 2022

(87) PCT Pub. No.: WO2021/087682
PCT Pub. Date: May 14, 2021

(65) Prior Publication Data
US 2022/0361212 A1    Nov. 10, 2022

(51) Int. Cl.
*H04W 72/1273* (2023.01)
*H04L 1/1812* (2023.01)
*H04W 4/70* (2018.01)
*H04W 72/23* (2023.01)

(52) U.S. Cl.
CPC ....... *H04W 72/1273* (2013.01); *H04L 1/1812* (2013.01); *H04W 72/23* (2023.01); *H04W 4/70* (2018.02)

(58) Field of Classification Search
CPC ... H04W 72/1273; H04W 72/23; H04W 4/70; H04L 1/1812
See application file for complete search history.

(56) References Cited

U.S. PATENT DOCUMENTS

| | | | |
|---|---|---|---|
| 2018/0324779 A1 | 11/2018 | Li et al. | |
| 2019/0074937 A1* | 3/2019 | Bhattad | H04L 1/1896 |
| 2019/0313442 A1* | 10/2019 | Hosseini | H04L 5/0091 |
| 2021/0377990 A1* | 12/2021 | Yu | H04L 1/1864 |
| 2022/0022021 A1* | 1/2022 | Bi | H04W 4/90 |
| 2022/0232615 A1* | 7/2022 | Luo | H04W 72/0446 |

(Continued)

FOREIGN PATENT DOCUMENTS

| | | |
|---|---|---|
| CN | 109428668 A | 3/2019 |
| CN | 110546971 A | 12/2019 |
| EP | 3876649 A1 | 9/2021 |

OTHER PUBLICATIONS

PCT/CN2019/115405 English translation of International Search Report dated Jul. 16, 2020, 2 pages.

(Continued)

*Primary Examiner* — Xuan Lu
(74) *Attorney, Agent, or Firm* — Cozen O'Connor (57) ABSTRACT

A method for transmitting downlink control information (DCI), including: transmitting the DCI based on a mapping relationship between at least two of: a number of transmission blocks (TBs) in a multi-TB transmission, hybrid automatic repeat request (HARD) process numbers in the multi-TB transmission, new data indicators (NDIs) in the multi-TB transmission and a resource configuration mode for the multi-TB transmission.

16 Claims, 7 Drawing Sheets

(56) References Cited

U.S. PATENT DOCUMENTS

2022/0255670 A1\* 8/2022 Zhang .................. H04L 1/1864
2022/0287069 A1\* 9/2022 Sengupta .............. H04L 1/1635
2022/0369296 A1\* 11/2022 Hu ........................ H04L 1/1812

OTHER PUBLICATIONS

Sequans Communications; Consideration for scheduling multiple UL/DL TBs; 3GPP TSG RAN WG1 Meeting #96; R1-1907079; May 2019, 7 pages.

Russian Patent Application No. 2022115107, Office Action dated Jan. 26, 2023, 11 pages.

Russian Patent Application No. 2022115107, English translation of Office Action dated Jan. 26, 2023, 9 pages.

Xiaomi Communications "Discussion on the remaining issues of scheduling of multiple DLUL TBs" 3GPP TSG RAN WG1 Meeting #98bis; R1-1910886; Oct. 2019, 6 pages.

Huawei, et al. "Scheduling of multiple transport blocks" 3GPP TSG RAN WG1 Meeting #98bis; R1-1911387; Oct. 2019, 14 pages.

European Patent Application No. 19951713.7, Search and Opinion dated Oct. 19, 2022, 13 pages.

Indian Patent Application No. 202247031755, Office Action dated Sep. 27, 2022, 6 pages.

LG Electronics "Discussion on multiple transport blocks scheduling in MTC" 3GPP TSG RAN WG1 #98bis, R1-1910804, Oct. 2019, 13 pages.

Xiaomi Communications "Further discussion on the scheduling of multiple DL/UL TBs" 3GPP TSG RAN WG1 Meeting #98, R1-1909112, Aug. 2019, 5 pages.

ZTE "Consideration on scheduling enhancement for MTC" 3GPP TSG RAN WG1 Meeting #98b, R1-1910264, Oct. 2019, 20 pages.

Ericsson "Feature lead summary #2 for Scheduling of multiple DL/UL transport blocks for LTE-MTC" 3GPP TSG-RAN WG1 Meeting #98bis, R1-1911381, Oct. 2019, 26 pages.

Korean Patent Application No. 10-2022-7019010, Office Action with English translation dated Mar. 20, 2025, 20 pages.

\* cited by examiner

METHOD FOR TRANSMITTING DCI, COMMUNICATION DEVICE AND STORAGE MEDIUM

CROSS-REFERENCE TO RELATED APPLICATION

This application is a national phase of International Application No. PCT/CN2019/115405, filed on Nov. 4, 2019, the entire content of which is incorporated herein by reference.

TECHNICAL FIELD

The disclosure relates to the field of wireless communication technologies, and in particular to a method for transmitting downlink control information (DCI), a communication device and a storage medium.

BACKGROUND

In recent years, Internet of Things (IoT) has flourished, bringing many conveniences to human life and work. Machine Type Communication (MTC) is a typical representative of cellular IoT technologies. At present, the MTC technology has been widely applied in smart cities (e.g., meter reading), smart agriculture (e.g., collection of information such as temperature and humidity), smart transportation (e.g., bicycle sharing) and many other fields. A terminal applying the MTC technology can be referred to as an MTC terminal.

However, in a scheduling process of information transmission by the MTC terminal, it is found that there is a problem of large signaling overhead.

SUMMARY

A method for transmitting DCI is provided, including: transmitting the DCI based on a mapping relationship between at least two of: a number of transmission blocks (TBs) in a multi-TB transmission, hybrid automatic repeat request (HARQ) process numbers in the multi-TB transmission, new data indicators (NDIs) in the multi-TB transmission and a resource configuration mode for the multi-TB transmission.

A method for determining information is provided, including: receiving DCI; and determining, based on a mapping relationship indicated by the DCI, at least one of the following information: a number of TBs in a multi-TB transmission, HARQ process numbers in the multi-TB transmission, NDIs in the multi-TB transmission and a resource configuration mode for the multi-TB transmission.

A communication device is provided, including: an antenna; a memory; and a processor, connected to the antenna and the memory and configured to, by executing executable programs stored on the memory, control the antenna to transmit and receive wireless signals and perform actions in the method provided by any of the foregoing technical solutions.

A non-transitory computer-readable storage medium is provided. The non-transitory computer-readable storage medium has stored therein executable programs. When the executable programs are executed by a processor, actions in the method provided by any of the foregoing technical solutions are performed.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing embodiments and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second and third may be used in this disclosure to describe various information, the information should not be limited to these terms. These terms are only used to distinguish the same type of information from each other. For example, without departing from the scope of the disclosure, the instruction information may also be referred to as the second information. Similarly, the second information may also be referred to as the instruction information. Depending on the context, the word "if" as used herein can be interpreted as "when", "while" or "in response to determining".

Figure 1:
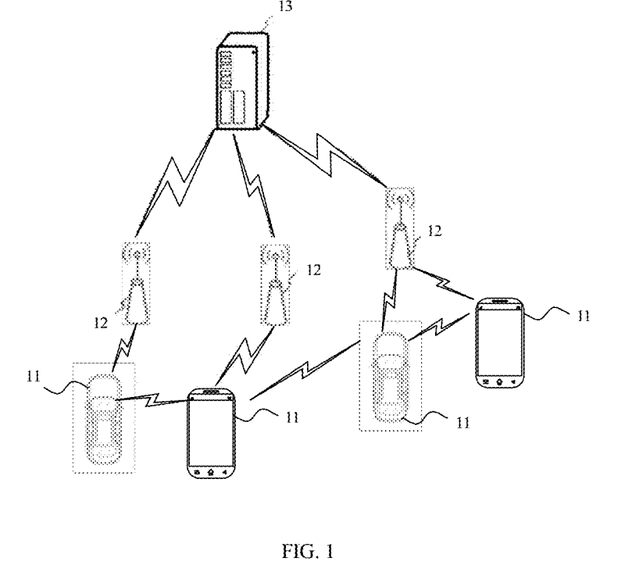
FIG. 1 is a schematic structural diagram illustrating a wireless communication system, according to some embodiments of the disclosure.

FIG. 1 is a schematic structural diagram illustrating a wireless communication system, according to some embodiments of the disclosure. As illustrated in FIG. 1, the wireless communication system is a communication system based on cellular mobile communication technologies. The wireless communication system includes terminals 11 and base stations 12.

The terminal 11 is a device that provides voice and/or data connectivity to a user. The terminal 11 can communicate with one or more core networks via a radio access network (RAN). The terminal 11 can be an IoT terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 11 may also be an unmanned aircraft. Alternatively, the terminal 11 may also be an in-vehicle device, for example, a trip computer having a wireless communication function or a wireless communication device connected to the trip computer. Alternatively, the terminal 11 may also be a roadside device, for example, a street lamp, a signal lamp or other roadside device having the wireless communication function.

The base station 12 may be a network side device in the wireless communication system. The wireless communication system may be the $4^{th}$ generation mobile communication (4G) system, also known as the long term evolution (LTE) system. The wireless communication system may also be the $5^{th}$ generation mobile communication (5G) system, also known as the new radio (NR) system or 5G NR system. Alternatively, the wireless communication system may also be a next-generation system of the 5G system. The access network in the 5G system can be called the new generation-radio access network (NG-RAN). The wireless communication system may also be the MTC system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. Embodiments of the disclosure does not limit the specific implementation manner of the base station 12.

A wireless link can be established between the base station 12 and the terminal 11 through a wireless air interface. In different embodiments, the wireless air interface is a wireless air interface based on the 4G standard. Alternatively, the wireless air interface is a wireless air interface based on the 5G standard, for example, the wireless air interface is a NR. The wireless air interface can also be a wireless air interface based on a standard of next generation mobile communication network technology based on the 5G standard.

In some embodiments, an end to end (E2E) link may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in embodiments of the disclosure.

Figure 2:
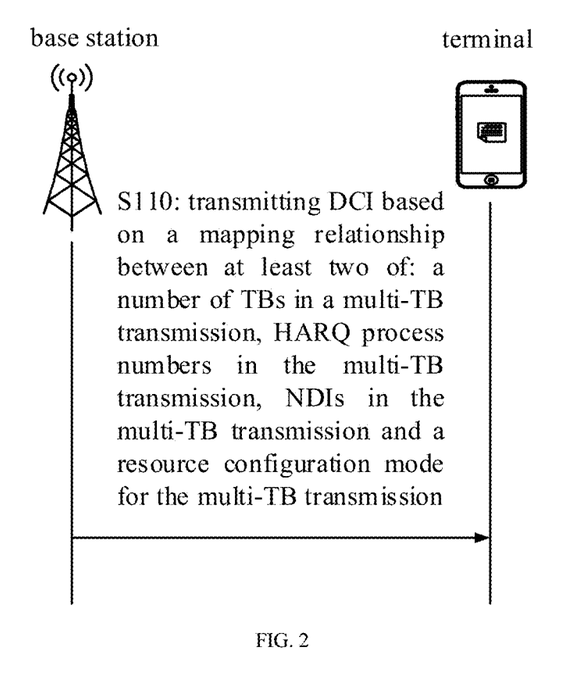
FIG. 2 is a flow chart illustrating a method for transmitting DCI, according to some embodiments of the disclosure.

As illustrated in FIG. 2, embodiments of the disclosure provide a method for transmitting DCI and the method includes the following.

S110, the DCI is transmitted based on a mapping relationship between at least two of: a number of TBs in a multi-TB transmission, HARQ process numbers in the multi-TB transmission, NDIs in the multi-TB transmission and a resource configuration mode for the multi-TB transmission.

In some embodiments, the method for transmitting DCI can be applied to the base station. The base station can transmit the DCI to the terminal. Both the base station and the terminal can be MTC devices in the MTC system.

In some embodiments, a TB can be a data transmission block containing data content. Different TBs can contain different data content.

In some embodiments, the MTC system can support multiple HARQ processes. For example, it can support up to 8 HARQ processes. Each scheduled TB can correspond to an HARQ process. Each HARQ process needs a HARQ process number for marking. For example, 8 HARQ processes need 8 HARQ process numbers for marking. The 8 HARQ processes can be marked by HARQ process numbers 0, 1, 2, 3, 4, 5, 6 and 7 in sequence.

In some embodiments, the NDI is configured to mark whether the current TB is a newly-transmitted TB or a retransmitted TB. Each TB corresponds to an NDI. For example, when the current TB is a newly-transmitted TB, the bit corresponding to the NDI can be set to "1". When the current TB is a retransmitted TB, the bit corresponding to the NDI can be set to "0".

In some embodiments, in order to reduce the signaling overhead, the base station can pre-configure the mapping relationship between at least two of: the number of TBs in a multi-TB transmission, the HARQ process numbers in the multi-TB transmission, the NDIs in the multi-TB transmission and the resource configuration mode for the multi-TB transmission. Or, the mapping relationship between at least two of: the number of TBs in a multi-TB transmission, the HARQ process numbers in the multi-TB transmission, the NDIs in the multi-TB transmission and the resource configuration mode for the multi-TB transmission, can be pre-prescribed in a communication protocol. The mapping relationship can be stored in a storage area in the base station or terminal in the form of a table to facilitate the inquiry of the base station or terminal.

In some embodiments, the number of TBs can be the number of different TBs, that is, the number of TBs that transmit different content. The number of TBs is related to the amount of data that the terminal needs to transmit. For example, when the amount of data that the terminal needs to transmit is greater than a first threshold, the number of TBs is set to be greater than a second threshold; when the amount of data that the terminal needs to transmit is less than the first threshold, the number of TBs is set to be less than the second threshold.

In some embodiments, different mapping relationships may be sorted and different indicator values or index values may be set to indicate the mapping relationships. The DCI can directly indicate the mapping relationship through an indicator value or an index value. In this way, after receiving the DCI, the terminal can determine the specific mapping relationship currently indicated by parsing the DCI or querying a preset mapping relationship table based on the DCI and determine all or part of the information in the number of TBs in the multi-TB transmission, the HARQ process numbers in the multi-TB transmission, the NDIs in the multi-TB transmission and the resource configuration mode for the multi-TB transmission.

Figure 3:
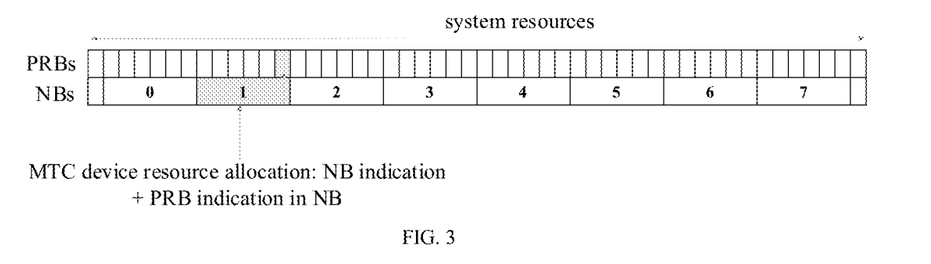
FIG. 3 is a schematic diagram of resource allocation, according to some embodiments of the disclosure.

With reference to FIG. 3, supporting low complexity/low cost in the MTC communication can be achieved by limiting a communication bandwidth of the MTC terminal. Under normal circumstances, MTC can support the communication bandwidth of 6 physical resource blocks (PRBs). In order to support the MTC narrow band communication, the entire system bandwidth can be divided into multiple narrow bands (NBs). For example, NBs numbered 0, 1, 2, 3, 4, 5, 6 and 7 in FIG. 3. The base station can first allocate one of the multiple NBs to a certain MTC terminal. For example, the NB indicated in FIG. 3 (corresponding to number 1). Subsequently, PRB resources are further allocated in the allocated NB. The system bandwidth in FIG. 3 is 50 PRBs. By indicating the NB number, it is equivalent to indicating a set of resources allocated for the MTC terminal and then it is specifically indicating which PRBs in the NB are allocated to the MTC terminal. For the allocation of the PRBs in the NB, the allocated resources are indicated by indicating the starting point of the allocation and the amount of allocated resources.

In some embodiments, as illustrated in Table 1, for the bandwidth of 6 PRBs, in the coverage enhancement mode A, 5 bits need to be used for separate indication of resource configuration. Both the NB indication and the PRB indication in the NB can be carried by the DCI.

Table 1 shows a correspondence where the resource configuration mode is indicated by the DCI.

TABLE 1

| DCI (5 bits) | source starting location (PRB number) | allocated resources (the number of PRBs) | allocated resource location (the set of PRB numbers) |
|---|---|---|---|
| 00000 | 1 | 1 | 1 |
| 00001 | 1 | 2 | 1, 2 |
| 00010 | 1 | 3 | 1, 2, 3 |
| 00011 | 1 | 4 | 1, 2, 3, 4 |
| 00100 | 1 | 5 | 1, 2, 3, 4, 5 |
| 00101 | 1 | 6 | 1, 2, 3, 4, 5, 6 |
| 00110 | 2 | 1 | 2 |
| 00111 | 2 | 2 | 2, 3 |
| 01000 | 2 | 3 | 2, 3, 4 |
| 01001 | 2 | 4 | 2, 3, 4, 5 |
| 01010 | 2 | 5 | 2, 3, 4, 5, 6 |
| 01011 | 3 | 1 | 3 |
| 01100 | 3 | 2 | 3, 4 |
| 01101 | 3 | 3 | 3, 4, 5 |
| 01110 | 3 | 4 | 3, 4, 5, 6 |
| 01111 | 4 | 1 | 4 |
| 10000 | 4 | 2 | 4, 5 |
| 10001 | 4 | 3 | 4, 5, 6 |
| 10010 | 5 | 1 | 5 |
| 10011 | 5 | 2 | 5, 6 |
| 10100 | 6 | 1 | 6 |
| 10101~ 11111 | | reserved bits | |

The separate indication of the resource configuration mode requires more signaling overhead.

In some embodiments, at least two of: the number of TBs in the multi-TB transmission, the HARQ process numbers in the multi-TB transmission, the NDIs in the multi-TB transmission and the resource configuration mode for the multi-TB transmission, can be indicated by an information field in the DCI. In this way, one information field is used to indicate at least two kinds of information at the same time. Compared with that an information field is set for each type of information, it reduces the signaling overhead.

As illustrated in Table 2, a mapping relationship between the number of TBs and the resource configuration mode is described.

Table 2 is the mapping relationship between the number of TBs and the resource configuration mode.

TABLE 2

| | | the resource configuration mode | | |
|---|---|---|---|---|
| DCI (5 bits) | the number of TBs | source starting location (PRB number) | allocated resources (the number of PRBs) | allocated resource location (the set of PRB numbers) |
| 00000 | 1 | 1 | 1 | 1 |
| 00001 | | 1 | 2 | 1, 2 |
| 00010 | | 1 | 3 | 1, 2, 3 |
| 00011 | | 1 | 4 | 1, 2, 3, 4 |
| 00100 | | 1 | 5 | 1, 2, 3, 4, 5 |
| 00101 | | 1 | 6 | 1, 2, 3, 4, 5, 6 |
| 00110 | | 2 | 1 | 2 |
| 00111 | | 2 | 2 | 2, 3 |
| 01000 | | 2 | 3 | 2, 3, 4 |
| 01001 | | 2 | 4 | 2, 3, 4, 5 |
| 01010 | | 2 | 5 | 2, 3, 4, 5, 6 |
| 01011 | | 3 | 1 | 3 |
| 01100 | | 3 | 2 | 3, 4 |
| 01101 | | 3 | 3 | 3, 4, 5 |
| 01110 | | 3 | 4 | 3, 4, 5, 6 |
| 01111 | | 4 | 1 | 4 |
| 10000 | | 4 | 2 | 4, 5 |
| 10001 | | 4 | 3 | 4, 5, 6 |
| 10010 | | 5 | 1 | 5 |
| 10011 | | 5 | 2 | 5, 6 |
| 10100 | | 6 | 1 | 6 |
| 10101 | 2 | 1 | 3 | 1, 2, 3 |
| 10110 | | 4 | 3 | 4, 5, 6 |
| 10111 | | 1 | 6 | 1, 2, 3, 4, 5, 6 |
| 11000 | 3 | 1 | 6 | 1, 2, 3, 4, 5, 6 |
| 11001 | 4 | 1 | 6 | 1, 2, 3, 4, 5, 6 |
| 11010 | 5 | 1 | 6 | 1, 2, 3, 4, 5, 6 |
| 11100 | 6 | 1 | 6 | 1, 2, 3, 4, 5, 6 |
| 11101 | 7 | 1 | 6 | 1, 2, 3, 4, 5, 6 |
| 11110 | 8 | 1 | 6 | 1, 2, 3, 4, 5, 6 |
| 11111 | | reserved bits | | |

5 bits in the DCI are used to carry indication information. After receiving the 5 bits of DCI, the terminal such as the MTC terminal can determine the number of TBs configured by the current base station for itself and the resource configuration for transmitting these TBs by looking up the table. Compared to the separate indication corresponding to Table 1, it has characteristics of low signaling overhead.

Figure 4:
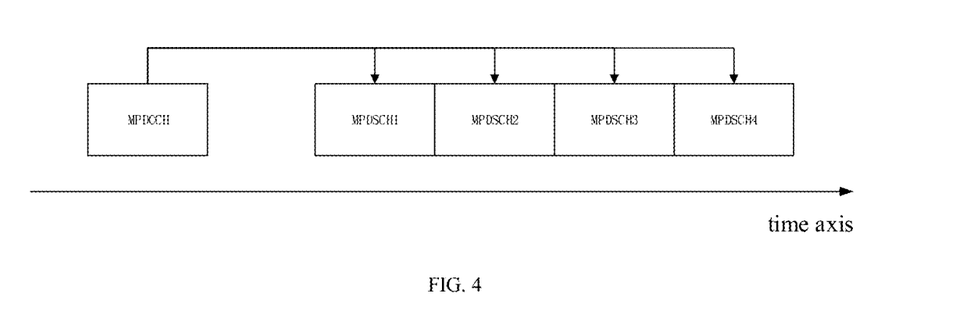
FIG. 4 is a schematic diagram of MPDCCH message scheduling, according to some embodiments of the disclosure.

In some embodiments, the DCI can be a component of a MTC physical downlink control channel (MPDCCH) message transmitted through the MPDCCH. Referring to FIG. 4, the MPDCCH message at one moment schedules MPDSCH data transmission at 4 moments. The 4 MPDSCHs in FIG. 4 are MPDSCH1, MPDSCH2, MPDSCH3 and MPDSCH4.

In some embodiments, the DCI can be information carried in the MPDCCH message. The MPDCCH message is a message transmitted using the MPDCCH. In the MTC coverage enhancement mode A, the DCI transmitted by the MPDCCH at one time can schedule up to 8 downlink received TBs. In the coverage enhancement mode B, the DCI transmitted by the MPDCCH can schedule up to 4 downlink received TBs.

In some embodiments of the disclosure, the DCI is transmitted based on the mapping relationship between at least two of: the number of TBs in the multi-TB transmission, the HARQ process numbers in the multi-TB transmission, the NDIs in the multi-TB transmission and the resource configuration mode for the multi-TB transmission. When indicating at least two of: the number of TBs, the HARQ process numbers, the NDIs and the resource configuration mode used, different information fields in the DCI are no longer used to indicate the number of TBs, the HARQ process numbers, the NDIs and the resource configuration mode used respectively. Instead, the DCI will be used to, by indicating the mapping relationship between at least two, inform the terminal of the number of TBs, the HARQ process numbers, the NDIs and the resource configuration mode used, configured by the base station for the terminal. In this way, only one DCI can be used to complete the indication, reducing the signaling overhead.

In some embodiments, in S110, the mapping relationship includes: a mapping relationship between the number of TBs and a starting number of consecutively-numbered HARQ process numbers; or a mapping relationship between the number of TBs and any combination of the HARQ process numbers; or a mapping relationship between the number of TBs and a predetermined combination of the HARQ process numbers.

In some embodiments, there may be 8 consecutively-numbered HARQ process numbers, which correspond to 0-7 respectively.

Table 3 shows the mapping relationship between the number of TBs (taking the number of TBs equal to 4 as an example) and the starting number of consecutively-numbered HARQ process numbers.

TABLE 3

| the number of TBs | the starting number of consecutively-numbered HARQ process numbers | HARQ process numbers of TBs |
|---|---|---|
| 4 | 1 | 1, 2, 3, 4 |
|   | 2 | 2, 3, 4, 5 |
|   | 3 | 3, 4, 5, 6 |
|   | 4 | 4, 5, 6, 7 |

When the HARQ process numbers are consecutively allocated, as long as the starting number of the consecutively-numbered HARQ process numbers is determined, the HARQ process number of each TB can be determined according to the number of the scheduled TBs. For example, in Table 3, after determining that the starting number of the consecutively-numbered HARQ process numbers is 2 and the number of scheduled TBs is 4, it can be determined that the HARQ process numbers of the TBs are 2, 3, 4 and 5.

Table 4 shows the mapping relationship between the number of TBs (taking the number of TBs equal to 2 as an example) and any combination of the HARQ process numbers.

TABLE 4

| the number of TBs | combination of the HARQ process numbers |
|---|---|
| 2 | (0, 1), (0, 2), (0, 3), (0, 4), (0, 5), (0, 6), (0, 7) |
|   | (1, 2), (1, 3), (1, 4), (1, 5), (1, 6), (1, 7) |
|   | (2, 3), (2, 4), (2, 5), (2, 6), (2, 7) |
|   | (3, 4), (3, 5), (3, 6), (3, 7) |
|   | (4, 5), (4, 6), (4, 7) |
|   | (5, 6), (5, 7) |
|   | (6, 7) |

After the number of TBs is determined to be equal to 2, the mapping relationship between the number of TBs and any of the foregoing combinations can be established.

Table 5 shows the mapping relationship between the number of TBs and the predetermined combination of the HARQ process numbers.

TABLE 5

| the number of TBs | predetermined combination of the HARQ process numbers |
|---|---|
| 1 | 1, 2, 3, 4, ... 8 |
| 2 | {1, 2} {3, 4} {5, 6} {7, 8} |
| 3 | {1, 2, 3} {4, 5, 6} {6, 7, 8} |
| 4 | ... |
| 5 | ... |
| 6 | ... |
| 7 | ... |
| 8 | {1, 2, 3, 4, ... 8} |

After the number of TBs is determined, the mapping relationship between the number of TBs and the aforementioned predetermined combination of the HARQ process numbers can be established.

In some embodiments, in S110, the mapping relationship between the number of TBs in the multi-TB transmission and the resource configuration mode for the multi-TB transmission includes: a mapping relationship between the number of TBs and a resource configuration mode using different resource granularities as scheduling units; and/or, a mapping relationship between the number of TBs and a resource configuration mode for resource scheduling on different resource sets.

In some embodiments, the resource granularity may include one PRB, one slot, one sub-slot, one symbol, one carrier, one sub-carrier and the like.

The resource granularity may be a time-domain resource granularity and/or a frequency-domain resource granularity. Different resource granularities can correspond to different resource amounts.

In some embodiments, there is the mapping relationship between the number of TBs and the resource configuration mode using different resource granularities as scheduling units.

As illustrated in Table 6, when the number of TBs is 1, 1 PRB is used as the scheduling unit for resource configuration. In this way, when the number of TBs is 1, the resource configured to the PRB is arbitrary integer and at least 1 PRB. When the number of TBs is 2, 3 PRBs is used as the scheduling unit for resource configuration. Thus, when the number of TBs is 2, the configured resource is integer multiples of 3 PRBs and at least 3 PRBs. When the number of TBs is greater than or equal to 3, 6 PRBs are used as the scheduling unit for resource configuration. Therefore, when the number of TBs is equal to or greater than 3, the resource configured to these TBs is integer multiples of 6 PRBs and at least 6 PRB.

Table 6 shows the mapping relationship between the number of TBs and the resource configuration mode.

TABLE 6

| | the resource configuration mode | | |
|---|---|---|---|
| the number of TBs | source starting location (PRB number) | allocated resources (the number of PRBs) | allocated resource location (the set of PRB numbers) |
| 1 | 1 | 1 | 1 |
| | 1 | 2 | 1, 2 |
| | 1 | 3 | 1, 2, 3 |
| | 1 | 4 | 1, 2, 3, 4 |
| | 1 | 5 | 1, 2, 3, 4, 5 |
| | 1 | 6 | 1, 2, 3, 4, 5, 6 |
| | 2 | 1 | 2 |
| | 2 | 2 | 2, 3 |
| | 2 | 3 | 2, 3, 4 |
| | 2 | 4 | 2, 3, 4, 5 |
| | 2 | 5 | 2, 3, 4, 5, 6 |
| | 3 | 1 | 3 |
| | 3 | 2 | 3, 4 |
| | 3 | 3 | 3, 4, 5 |
| | 3 | 4 | 3, 4, 5, 6 |
| | 4 | 1 | 4 |
| | 4 | 2 | 4, 5 |
| | 4 | 3 | 4, 5, 6 |
| | 5 | 1 | 5 |
| | 5 | 2 | 5, 6 |
| | 6 | 1 | 6 |
| 2 | 1 | 3 | 1, 2, 3 |
| | 4 | 3 | 4, 5, 6 |
| | 1 | 6 | 1, 2, 3, 4, 5, 6 |
| 3 | 1 | 6 | 1, 2, 3, 4, 5, 6 |
| 4 | 1 | 6 | 1, 2, 3, 4, 5, 6 |
| 5 | 1 | 6 | 1, 2, 3, 4, 5, 6 |
| 6 | 1 | 6 | 1, 2, 3, 4, 5, 6 |
| 7 | 1 | 6 | 1, 2, 3, 4, 5, 6 |
| 8 | 1 | 6 | 1, 2, 3, 4, 5, 6 |
| | | reserved | |

It should be noted that when the number of scheduled TBs is less than a fifth threshold X1, a resource configuration mode in which a resource granularity less than a sixth threshold X2 is used as the scheduling unit may be adopted. For example, if the fifth threshold X1=2, the sixth threshold X2=2 and the number of scheduled TBs is 1, one RB can be used as the scheduling unit for resource configuration. When the number of scheduled TBs is greater than a seventh threshold X3, a resource configuration mode in which a resource granularity greater than an eighth threshold X4 is used as the scheduling unit may be adopted. For example, if the seventh threshold X3=2, the eighth threshold X4=2 and the number of scheduled TBs is 3, a resource configuration mode with 3 RBs or 6 RBs as the scheduling unit may be adopted. The above threshold may be set differently based on different data transmission scenarios. The threshold can be configured through high-level signaling.

In some embodiments, numbers of resources in the different resource sets are different; and/or, locations of resources in the different resource sets are different.

In some embodiments, at least one of the resources included in different resource sets is different. For example, the number of PRBs included in different resource sets is different, for example, a resource set with a number of PRBs of 3 and a resource set with a number of PRBs of 4. Different resource sets contain different resource locations, such as a resource set with resource locations 1, 2 and 3 and a resource set with resource locations 1, 2 and 4. The resource location herein includes a frequency-domain location and/or a time-domain location.

In some embodiments, the mapping relationship between the number of TBs and the resource configuration mode using different resource granularities as scheduling units includes: a mapping relationship between a number of TBs that is less than a first threshold and a resource configuration mode using a first resource granularity as the scheduling unit; and/or, a mapping relationship between a number of TBs that is equal to or greater than the first threshold and a resource configuration mode using a second resource granularity as the scheduling unit; in which the second resource granularity is greater than the first resource granularity.

The first resource granularity and the second resource granularity both may be an integer number of PRBs.

For example, the scheduling unit of resource configuration may be 1 PRB, 3 PRBs or 6 PRBs.

When the number of scheduled TBs is less than the threshold A, a smaller-granularity resource configuration mode is adopted, for example, a PRB can be used as a unit for configuration. When the number of scheduled TBs is greater than the threshold A, a larger granularity is used for configuration. For example, the resource configuration can be performed with a granularity of 3 PRBs or 6 PRBs.

When a larger granularity is used for configuration, the manner of restricting a resource configuration location can be further used to further compress the required number of bits. For example, when three PRBs are used as the granularity for configuration, in a narrow band (6 PRBs), only PRB 1, 2, 3 or PRB 4, 5, 6 can be allocated. It does not support PRB 2, 3, 4, or PRB 3, 4, 5 and other configuration manners.

There may be one or more TB thresholds for determining the granularity of resource configuration. The above-mentioned threshold can be fixed by the protocol or configured by high-level signaling.

In some embodiments, the larger the number of scheduled TBs, the more the resources needed to transmit TBs. Therefore, resource configuration will be performed with a larger resource granularity, so as to meet the resource configuration requirements of a large number of TBs.

In some embodiments, the mapping relationship between the number of TBs and the resource configuration mode for resource scheduling on different resource sets includes: a mapping relationship between a number of TBs that is less than a second threshold and a resource configuration mode for resource scheduling on a first resource set; a mapping relationship between a number of TBs that is equal to or greater than a second threshold and a resource configuration mode for resource scheduling on a second resource set; in which a number of resource combination modes in the second resource set is smaller than a number of resource combination modes in the first resource set.

In some embodiments, the second threshold may be equal to or different from the first threshold.

The resource combination mode can be a combination of PRB(s) at one or more different resource locations.

In some embodiments, the resource combination modes included in the second resource set and the resource combination modes included in the first resource set are different, indicating that the resource configuration modes are different.

In some embodiments, the larger the number of TBs, the larger the number of optional resources participating in transmission. In some embodiments, the resource combination modes are defined in the first resource set and the second resource set in advance. In this way, through the mapping relationship, the resource combination mode is limited, so that compared with separately indicating each resource selected for TB transmission, the bit overhead is further reduced.

In some embodiments, the mapping relationship includes: a mapping relationship between the number of TBs and a first indication state of the NDIs, in which the first indication state is for indicating that each of the TBs is in a new transmission state; or a mapping relationship between the number of TBs and a second indication state of the NDIs, where in which the second indication state is for indicating that each of the TBs is in a retransmission state.

The first indication state and the second indication state of the NDIs can be represented by 1 bit; for example, when the bit is set to "0", it represents the first indication state of the NDIs; when the bit is set to "1", it represents the second indication state of the NDIs. Herein, each HARQ process can save one NDI. If the NDI value of the same HARQ process has changed compared with the previous value, it indicates that the current transmission is a new transmission of a new TB, which can be indicated by the first indication state and means that the TB is in a new transmission state. If the NDI value of the same HARQ process has not changed compared with the previous value, it indicates that the current transmission is a retransmission of the same TB, which can be indicated by the second indication state and means that the TB is in a retransmission state.

Table 7 shows the mapping relationship between the number of TBs (with the number of TBs being 1 and 2 for illustration) and the NDIs for the multi-TB transmission.

TABLE 7

| the number of TBs | NDI state |
|---|---|
| 1 | 0 |
|   | 1 |
| 2 | 00 |
|   | 01 |
|   | 10 |
|   | 11 |

Several examples are provided below in conjunction with any of the above embodiments.

Example 1

Figure 5:
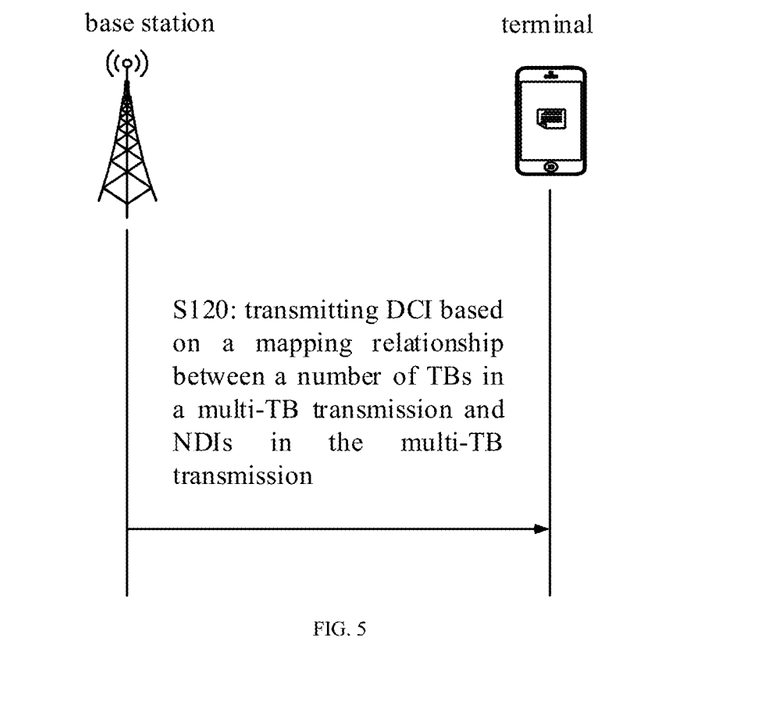
FIG. 5 is a flow chart illustrating a method for transmitting DCI, according to some embodiments of the disclosure.

As illustrated in FIG. 5, some embodiments of the disclosure provide a method for transmitting DCI and the method includes the following.

S120, the DCI is transmitted based on a mapping relationship between a number of TBs in a multi-TB transmission and NDIs in the multi-TB transmission.

The number of TBs included in the DCI and the NDIs in the multi-TB transmission may be jointly coded based on the mapping relationship, to obtain the jointly coded DCI and the DCI is transmitted.

Table 8 shows the mapping relationship between the number of TBs and the NDIs in the multi-TB transmission.

TABLE 8

| the number of TBs | the number of NDI states | the total number of states required and bits required |
|---|---|---|
| 1 | 2 | 510 |
| 2 | $2^2$ | 9 bit |
| 3 | $2^3$ | |
| 4 | $2^4$ | |
| 5 | $2^5$ | |

TABLE 8-continued

| the number of TBs | the number of NDI states | the total number of states required and bits required |
|---|---|---|
| 6 | $2^6$ | |
| 7 | $2^7$ | |
| 8 | $2^8$ | |

The number of scheduled TBs and the NDIs are jointly coded. When one TB is scheduled, NDI has two states, that is, whether the TB is a new transmission or a retransmission. Similarly, when 2 TBs are scheduled, there are 4 states of the NDIs for these 2 TBs. Based on Table 8, the number of TBs and the NDIs can be jointly coded.

Table 9 shows the relationship between the number of TBs and the NDIs for joint coding.

TABLE 9

| DCI bits | the number of TBs | NDI states |
|---|---|---|
| 000000000 | 1 | 0 |
| 000000001 |   | 1 |
| 000000010 | 2 | 00 |
| 000000011 |   | 01 |
| 000000100 |   | 10 |
| 000000101 |   | 11 |
| ... | ... | ... |
| 111111100 | 8 | 111111110 |
| 111111101 |   | 111111111 |
| 111111110 |   | reserved |

In this example, compared to the separate coding manner, the number of scheduled TBs and the NDIs are jointly coded and the two types of information can be transmitted through one DCI, which can greatly reduce the DCI overhead.

Example 2

Figure 6:
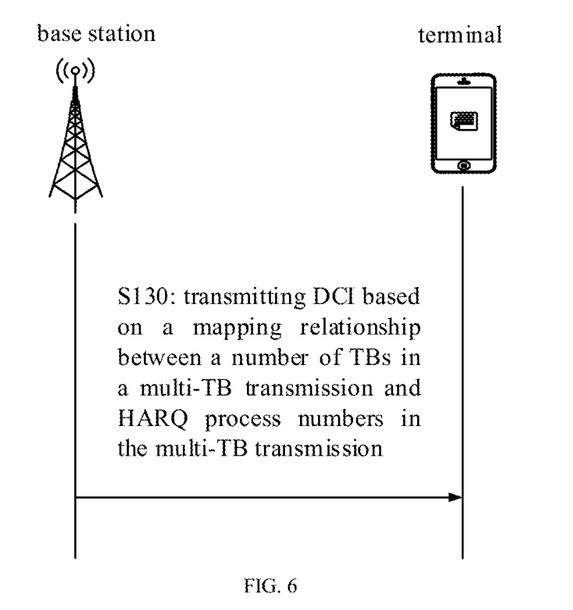
FIG. 6 is a flow chart illustrating a method for transmitting DCI, according to some embodiments of the disclosure.

As illustrated in FIG. 6, some embodiments of the disclosure provide a method for transmitting DCI and the method includes the following.

S130, the DCI is transmitted based on a mapping relationship between a number of TBs in a multi-TB transmission and HARQ process numbers in the multi-TB transmission.

The number of TBs included in the DCI and the HARQ process numbers in the multi-TB transmission may be jointly coded based on the mapping relationship, to obtain the jointly coded DCI and the DCI is transmitted.

To reduce the overhead of DCI, the number of scheduled TBs can be limited. For example, only TB scheduling with 1, 2, 4 and 8 TBs is supported. The number of HARQ processes can also be compressed, for example, only an allocation of consecutive HARQ process numbers or a combination allocation of HARQ processes is supported.

The case where the number are 1, 2, 4 and 8, respectively, will be described as an example.

Table 10 shows the relationship between the number of TBs and the number of possible states of the starting number of the HARQ process numbers.

TABLE 10

| the number of TBs | the number of possible states of the starting number of the HARQ process numbers | the total number of states required and bits required |
|---|---|---|
| 1 | 8 | 21 |
| 2 | 7 | 5 bit |
| 4 | 5 | |
| 8 | 1 | |

The HARQ process numbers are consecutively numbered and the number of TBs is 1, 2, 3, 4, 5, 6, 7 and 8 as an example for description.

Table 11 shows the relationship between the number of TBs and the starting number of the HARQ process numbers for joint coding.

TABLE 11

| DCI bits | the number of TBs | the starting number of the HARQ process numbers |
|---|---|---|
| 00000 | 1 | 1 |
| 00001 | | 2 |
| 00010 | | 3 |
| 00011 | | 4 |
| 00100 | | 5 |
| 00101 | | 6 |
| 00110 | | 7 |
| 00111 | | 8 |
| 01000 | 2 | 1 |
| 01001 | | 2 |
| 01010 | | 3 |
| 01011 | | 4 |
| 01100 | | 5 |
| 01101 | | 6 |
| 01110 | | 7 |
| .... | .... | .... |
| 10101 | 8 | 8 |
| 10110~11111 | | reserved |

Compared to the separate coding manner, the number of scheduled TBs and the HARQ process numbers are jointly coded and the two types of information can be transmitted through one DCI, which can greatly reduce the DCI overhead. After restricting or compressing the number of TBs and HARQ process numbers, the DCI overhead is further reduced.

Example 3

Figure 7:
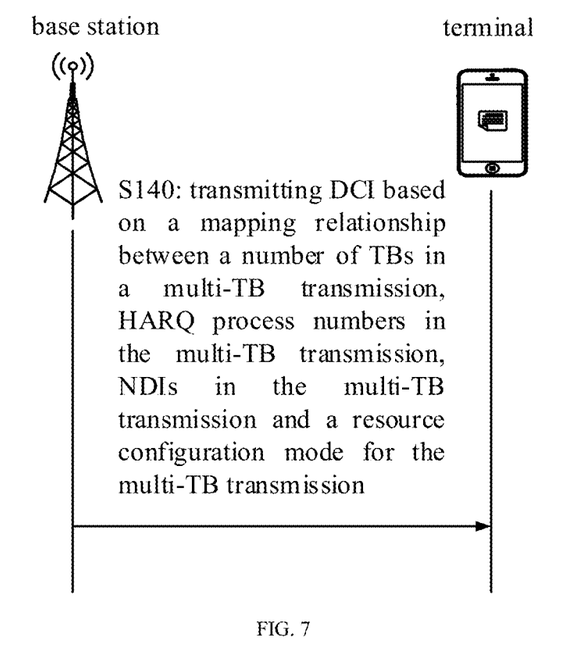
FIG. 7 is a flow chart illustrating a method for transmitting DCI, according to some embodiments of the disclosure.

As illustrated in FIG. 7, some embodiments of the disclosure provide a method for transmitting DCI and the method includes the following.

S140, the DCI is transmitted based on a mapping relationship between a number of TBs in a multi-TB transmission, HARQ process numbers in the multi-TB transmission, NDIs in the multi-TB transmission and a resource configuration mode for the multi-TB transmission.

The number of TBs in the multi-TB transmission, the HARQ process numbers in the multi-TB transmission, the NDIs in the multi-TB transmission and the resource configuration mode for the multi-TB transmission may be jointly coded based on the mapping relationship, to obtain the jointly coded DCI and the DCI is transmitted.

The number of scheduled TBs can be further restricted. For example, only TB scheduling with 1, 2, 4 and 8 TBs is supported. Only an allocation of consecutive HARQ process numbers can be supported. Different compressions for different numbers of TBs may be adopted for resource configuration. For example, when the number of TBs is 1, no compression is performed and there are 21 states in total. When the number of TBs is 2, the resource configuration is compressed and there are 3 states in total. When the number of TBs is greater than 2, only 6 PRB resource configuration is supported and there are a total of 808 states.

Table 12 shows the relationship between the number of TBs, the number of HARQ process number states, the number of NDI states and the number of resource configuration states.

TABLE 12

| the number of TBs | the number of HARQ process number states | the number of NDI states | the number of resource configuration states | the total number of states |
|---|---|---|---|---|
| 1 | 8 | 2 | 21 | 808 |
| 2 | 7 | $2^2$ | 3 | |
| 4 | 5 | $2^4$ | 1 | |
| 8 | 1 | $2^8$ | 1 | |

Table 13 shows the relationship of joint coding for the above 808 states. At this time, 10 bits are required.

TABLE 13

| DCI bit | the number of TBs | the starting number of the HARQ process numbers | NDI states | starting PRB | the number of PRBs | PRB location |
|---|---|---|---|---|---|---|
| 0000000000 | 1 | 1 | 0 | 1 | 1 | {1} |
| 0000000001 | 1 | 1 | 0 | 1 | 2 | {1, 2} |
| ... | ... | ... | ... | ... | ... | ... |
| 0000000110 | 1 | 1 | 0 | 2 | 1 | {2} |
| 0000000111 | 1 | 1 | 0 | 2 | 2 | {2, 3} |
| ... | ... | ... | ... | ... | ... | ... |
| 0000010101 | 1 | 1 | 1 | 1 | 1 | {1} |
| ... | ... | ... | ... | ... | ... | ... |
| 0000101001 | 1 | 2 | 0 | 1 | 1 | {1} |
| ... | ... | ... | ... | ... | ... | ... |
| 1001000101 | 1 | 8 | 1 | 1 | 6 | {1, 2, 3, 4, 5, 6} |
| 1001000101 | 2 | 1 | 00 | 1 | 3 | {1, 2, 3} |
| ... | ... | ... | ... | ... | ... | ... |
| 1100101000 | 8 | 8 | 11111111 | 1 | 6 | {1, 2, 3, 4, 5, 6} |
| 1100101001~1111111111 | | | reserved | | | |

In this example, compared to the separate coding manner, the number of TBs in the multi-TB transmission, the HARQ process numbers in the multi-TB transmission, the NDIs in the multi-TB transmission and the resource configuration mode for the multi-TB transmission may be jointly coded and the multiple types of information can be transmitted through one DCI, which can greatly reduce the DCI overhead. Further, after restricting or compressing the number of TBs, the HARQ process numbers and the resource configuration mode, the DCI overhead is further reduced.

Figure 8:
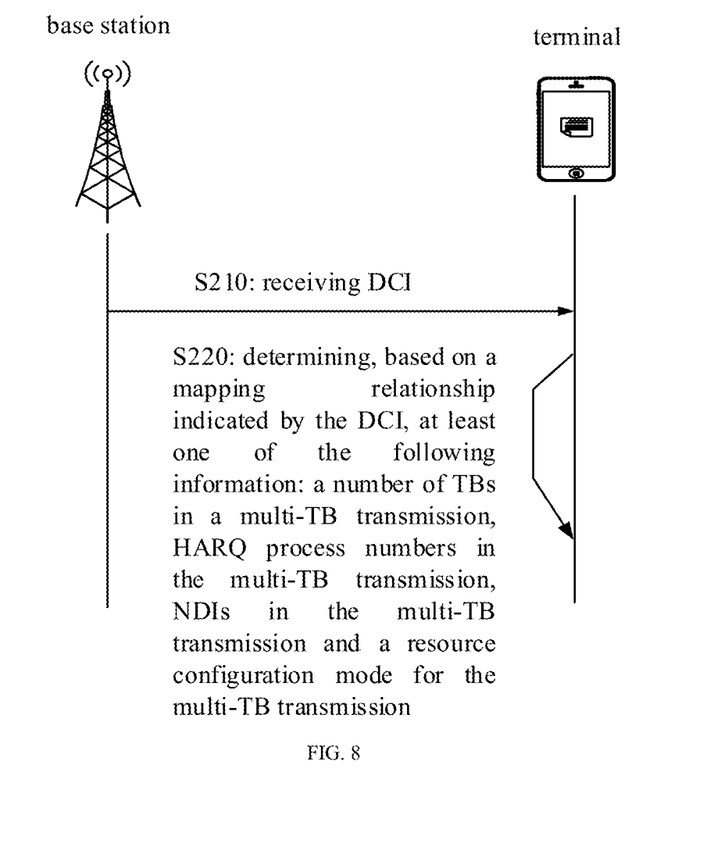
FIG. 8 is a flow chart illustrating a method for determining information, according to some embodiments of the disclosure.

As illustrated in FIG. 8, some embodiments of the disclosure provide a method for determining information and the method includes the following.

S210, DCI is received.

S220, based on a mapping relationship indicated by the DCI, at least one of the following information: a number of TBs in a multi-TB transmission, HARQ process numbers in the multi-TB transmission, NDIs in the multi-TB transmission and a resource configuration mode for the multi-TB transmission, is determined.

At least one of the following information: the number of TBs in the multi-TB transmission, the HARQ process numbers in the multi-TB transmission, the NDIs in the multi-TB transmission and the resource configuration mode for the multi-TB transmission, is determined based on the joint coding information of at least two of: the number of TBs in the multi-TB transmission, the HARQ process numbers in the multi-TB transmission, the NDIs in the multi-TB transmission and the resource configuration mode for the multi-TB transmission.

Figure 9:
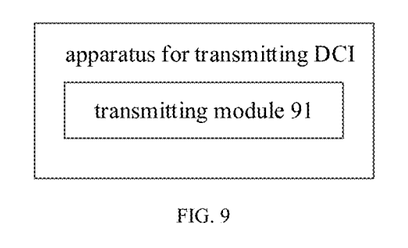
FIG. 9 is a block diagram illustrating an apparatus for transmitting DCI, according to some embodiments of the disclosure.

As illustrated in FIG. 9, some embodiments of the disclosure provide an apparatus for transmitting DCI and the apparatus includes a transmitting module 91. The transmitting module 91 is configured to, transmit the DCI based on a mapping relationship between at least two of: a number of TBs in a multi-TB transmission, HARQ process numbers in the multi-TB transmission, NDIs in the multi-TB transmission and a resource configuration mode for the multi-TB transmission.

In some embodiments, the mapping relationship includes: a mapping relationship between the number of TBs and a starting number of consecutively-numbered HARQ process numbers; or a mapping relationship between the number of TBs and any combination of the HARQ process numbers; or a mapping relationship between the number of TBs and a predetermined combination of the HARQ process numbers.

In some embodiments, the mapping relationship between the number of TBs in the multi-TB transmission and the resource configuration mode for the multi-TB transmission includes: a mapping relationship between the number of TBs and a resource configuration mode using different resource granularities as scheduling units; and/or, a mapping relationship between the number of TBs and a resource configuration mode for resource scheduling on different resource sets.

In some embodiments, numbers of resources in the different resource sets are different; and/or, locations of resources in the different resource sets are different.

In some embodiments, the mapping relationship between the number of TBs and the resource configuration mode using different resource granularities as scheduling units includes: a mapping relationship between a number of TBs that is less than a first threshold and a resource configuration mode using a first resource granularity as the scheduling unit; and/or, a mapping relationship between a number of TBs that is equal to or greater than the first threshold and a resource configuration mode using a second resource granularity as the scheduling unit; in which the second resource granularity is greater than the first resource granularity.

In some embodiments, the mapping relationship between the number of TBs and the resource configuration mode for resource scheduling on different resource sets includes: a mapping relationship between a number of TBs that is less than a second threshold and a resource configuration mode for resource scheduling on a first resource set; a mapping relationship between a number of TBs that is equal to or greater than a second threshold and a resource configuration mode for resource scheduling on a second resource set; in which a number of resource combination modes in the second resource set is smaller than a number of resource combination modes in the first resource set.

In some embodiments, the mapping relationship includes: a mapping relationship between the number of TBs and a first indication state of the NDIs, in which the first indication state is for indicating that each of the TBs is in a new transmission state; or a mapping relationship between the number of TBs and a second indication state of the NDIs, in which the second indication state is for indicating that each of the TBs is in a retransmission state.

Figure 10:
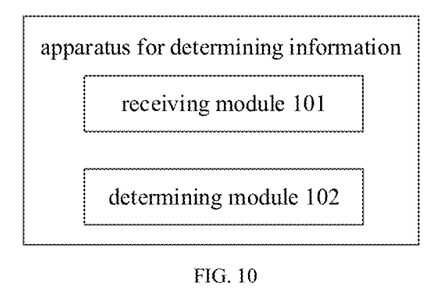
FIG. 10 is a block diagram illustrating an apparatus for determining information, according to some embodiments of the disclosure.

As illustrated in FIG. 10, some embodiments of the disclosure provide an apparatus for determining information and the apparatus includes a receiving module 101 and a determining module 102.

The receiving module 101 is configured to receive DCI.

The determining module 102 is configured to determine, based on a mapping relationship indicated by the DCI, at least one of the following information: a number of TBs in a multi-TB transmission, HARQ process numbers in the multi-TB transmission, NDIs in the multi-TB transmission and a resource configuration mode for the multi-TB transmission.

Some embodiments of the disclosure also provide a communication device, including: an antenna; a memory; and a processor, connected to the antenna and the memory and configured to, by executing executable programs stored on the memory, control the antenna to transmit and receive wireless signals and perform actions in the method for transmitting DCI or the method for determining information provided by any of the foregoing embodiments.

The communication device provided in some embodiments may be the aforementioned terminal or base station. The terminals may be a variety of human-borne terminals or vehicle-mounted terminals. The base stations may be various types of base stations, for example, 4G base stations or 5G base stations.

The antennas may be various types of antennas, for example, mobile antennas such as 3G antennas, 4G antennas or 5G antennas. The antenna may also include a wireless fidelity (Wi-Fi) antenna or a wireless charging antenna.

The memories may include various types of storage media and the storage media are non-transitory computer storage media that can continue to store the information stored thereon after the communication device is powered off.

The processor may be connected to the antenna and the memory via a bus or the like for reading executable programs stored on the memory, for example, at least one of the methods in FIG. 2, FIG. 5, FIG. 6, FIG. 7 and FIG. 8.

Some embodiments of the disclosure also provide a non-transitory computer-readable storage medium. The non-transitory computer-readable storage medium has stored therein executable programs. When the executable programs are executed by a processor, actions in the method for transmitting DCI or the method for determining information provided by any of the foregoing embodiments are performed, for example, at least one of the methods in FIG. 2, FIG. 5, FIG. 6, FIG. 7 and FIG. 8.

Figure 11:
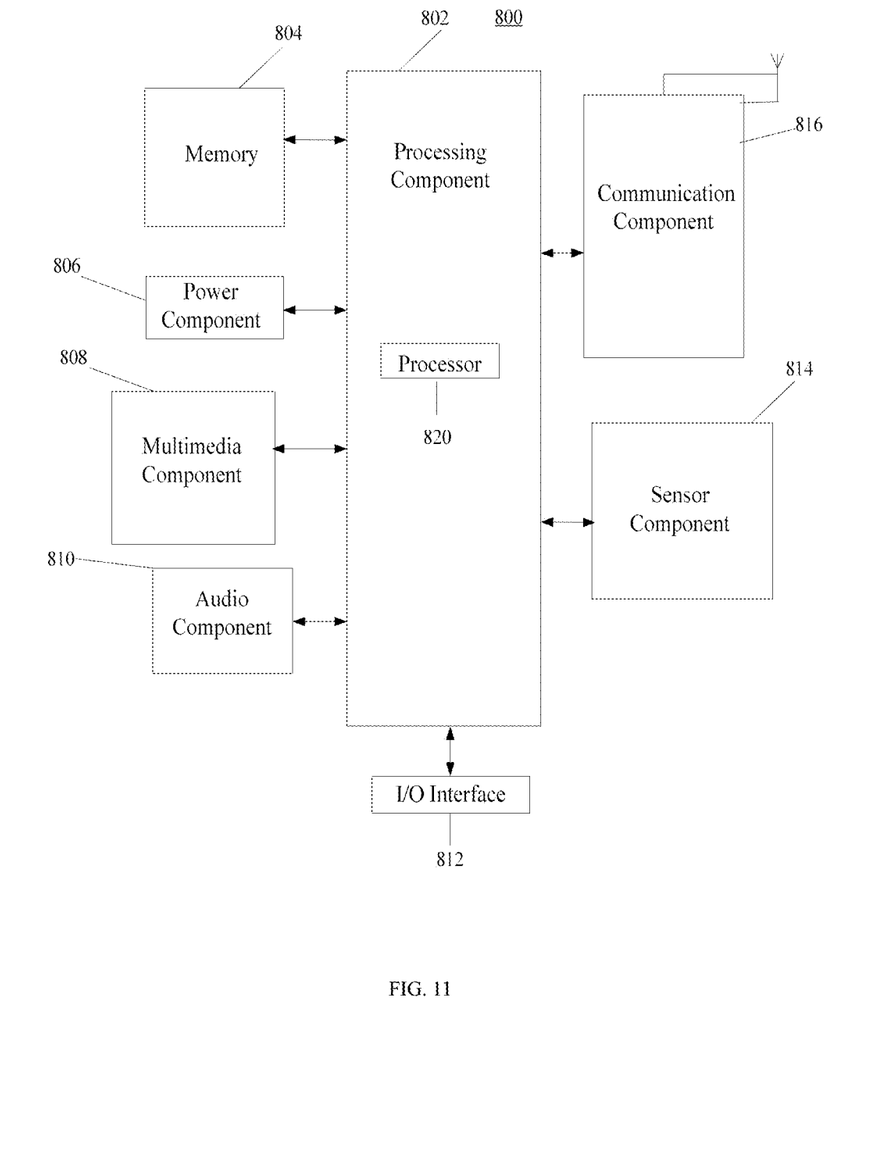
FIG. 11 is a block diagram illustrating a terminal, according to some embodiments of the disclosure.

As illustrated in FIG. 11, some embodiments of the disclosure provide a terminal.

Referring to the terminal 800 in FIG. 11, some embodiments of the disclosure provide the terminal 800. The device may be a mobile phone, a computer, a digital broadcast terminal, a messaging device, a gaming console, a tablet, a medical device, exercise equipment, a personal digital assistant, and the like.

Referring to FIG. 11, the terminal 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the actions in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

The terminal is used to perform the above method, for example, the method in FIG. 2, FIG. 5, FIG. 6, FIG. 7 or FIG. 8.

Figure 12:
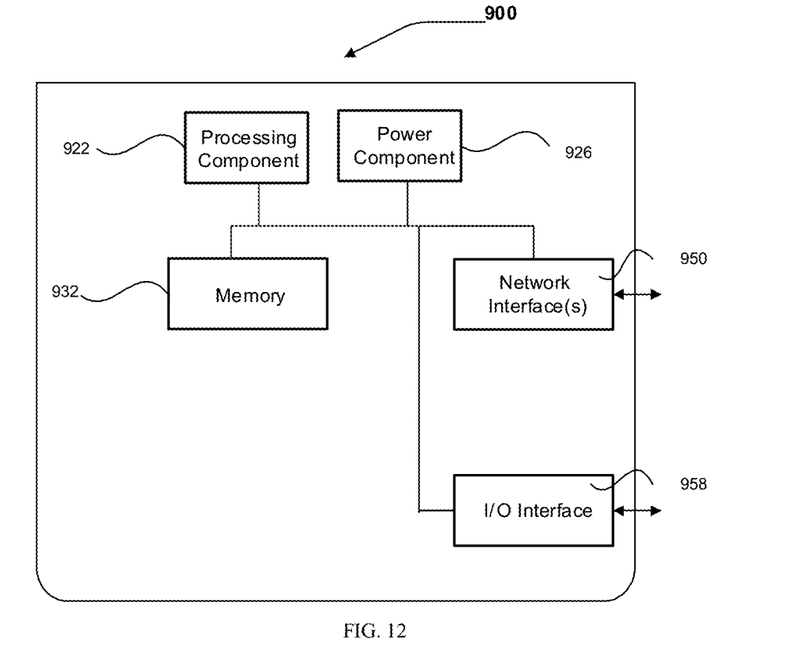
FIG. 12 is a block diagram illustrating a base station, according to some embodiments of the disclosure.

As illustrated in FIG. 12, some embodiments of the disclosure provide a base station. The base station 900 may be provided as a network-side device. The base station 900, referring to FIG. 12, may include a processing component 922 which further includes one or more processors, and a memory resource represented by a memory 932 for storing instructions executable by the processing component 922 such as application programs. An application program stored in the memory 932 may include one or more modules, each corresponding to a set of instructions. Additionally, the processing component 922 is configured to execute instructions to perform any of the aforementioned methods, e.g., the methods in in FIG. 2, FIG. 5, FIG. 6, FIG. 7 and FIG. 8.

The base station 900 may also include a power supply 926 configured to perform power management of the base station 900, a wired or wireless network interface 950 configured to connect the base station 900 to a network, and an input/output interfaces 958. The base station 900 may operate based on an operating system stored in the memory such as Windows Server™ Mac OS X™, Unix™, Linux™, Free-BSD™ or the like.

The wireless network interface 950 includes, but is not limited to, the antenna of the aforementioned communication device. Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting downlink control information (DCI), comprising:
    transmitting the DCI based on a mapping relationship between: a number of transmission blocks (TBs) in a multi-TB transmission, new data indicators (NDIs) in the multi-TB transmission and a resource configuration mode for the multi-TB transmission;
    wherein the mapping relationship between the number of TBs in the multi-TB transmission, the NDIs in the multi-TB transmission and the resource configuration mode for the multi-TB transmission comprises:
    the mapping relationship between the number of TBs, the NDIs in the multi-TB transmission and a resource configuration mode for resource scheduling on different resource sets.

2. The method as claimed in claim 1, wherein the mapping relationship is between at least the number of TBs in the multi-TB transmission and the resource configuration mode for the multi-TB transmission comprises:
    a mapping relationship between the number of TBs and a resource configuration mode using different resource granularities as scheduling units.

3. The method as claimed in claim 2, wherein the mapping relationship is between at least the number of TBs and the resource configuration mode using different resource granularities as scheduling units, and the mapping relationship comprises one or more of:
    a mapping relationship between a number of TBs that is less than a first threshold and a resource configuration mode using a first resource granularity as the scheduling unit;
    and
    a mapping relationship between a number of TBs that is equal to or greater than the first threshold and a resource configuration mode using a second resource granularity as the scheduling unit;
    wherein, the second resource granularity is greater than the first resource granularity.

4. The method as claimed in claim 1, wherein, at least one of numbers of resources in the different resource sets are different; and,
    locations of resources in the different resource sets are different.

5. The method as claimed in claim 1, wherein the mapping relationship is between at least the number of TBs and the resource configuration mode for resource scheduling on different resource sets, and the mapping relationship comprises:
    a mapping relationship between a number of TBs that is less than a second threshold and a resource configuration mode for resource scheduling on a first resource set;
    a mapping relationship between a number of TBs that is equal to or greater than a second threshold and a resource configuration mode for resource scheduling on a second resource set;
    wherein, a number of resource combination modes in the second resource set is smaller than a number of resource combination modes in the first resource set.

6. The method as claimed in claim 1, wherein the mapping relationship comprises:
    a mapping relationship between the number of TBs and a first indication state of the NDIs, wherein the first indication state is for indicating that each of the TBs is in a new transmission state;
    or,
    a mapping relationship between the number of TBs and a second indication state of the NDIs, wherein the second indication state is for indicating that each of the TBs is in a retransmission state.

7. A non-transitory computer-readable storage medium having stored therein computer executable instructions that, when executed by a processor, the method as claimed in claim 1 is performed.

8. A method for determining information, comprises:
    receiving downlink control information (DCI); and
    determining, based on a mapping relationship indicated by the DCI, a number of transmission blocks (TBs) in a multi-TB transmission, new data indicators (NDIs) in the multi-TB transmission and a resource configuration mode for the multi-TB transmission;
    wherein the mapping relationship comprises:
    the mapping relationship between the number of TBs, the NDIs in the multi-TB transmission and a resource configuration mode for resource scheduling on different resource sets.

9. A communication device, comprising:
an antenna;
a memory; and
a processor, connected to the antenna and the memory and configured to, by executing computer executable programs stored on the memory, control the antenna to transmit and receive and perform the method as claimed in claim 8.

10. A non-transitory computer-readable storage medium having stored therein computer executable instructions that, when executed by a processor, the method as claimed in claim 8 is performed.

11. A communication device, comprising:
an antenna;
a memory; and
a processor, connected to the antenna and the memory and configured to, by executing computer executable programs stored on the memory, control the antenna to transmit and receive and perform:
transmitting downlink control information (DCI) based on a mapping relationship between: a number of transmission blocks (TBs) in a multi-TB transmission, new data indicators (NDIs) in the multi-TB transmission and a resource configuration mode for the multi-TB transmission;
wherein the mapping relationship between the number of TBs in the multi-TB transmission, the NDIs in the multi-TB transmission and the resource configuration mode for the multi-TB transmission comprises:
the mapping relationship between the number of TBs, the NDIs in the multi-TB transmission and a resource configuration mode for resource scheduling on different resource sets.

12. The communication device as claimed in claim 11, wherein the mapping relationship is between at least the number of TBs in the multi-TB transmission and the resource configuration mode for the multi-TB transmission, and the mapping relationship comprises at least one of:
a mapping relationship between the number of TBs and a resource configuration mode using different resource granularities as scheduling units.

13. The communication device as claimed in claim 12, wherein the mapping relationship between the number of TBs and the resource configuration mode using different resource granularities as scheduling units comprises at least one of:
a mapping relationship between a number of TBs that is less than a first threshold and a resource configuration mode using a first resource granularity as the scheduling unit;
and,
a mapping relationship between a number of TBs that is equal to or greater than the first threshold and a resource configuration mode using a second resource granularity as the scheduling unit;
wherein, the second resource granularity is greater than the first resource granularity.

14. The communication device as claimed in claim 11, wherein, at least one of:
numbers of resources in the different resource sets are different;
and,
locations of resources in the different resource sets are different.

15. The communication device as claimed in claim 11, wherein the mapping relationship between the number of TBs and the resource configuration mode for resource scheduling on different resource sets comprises at least one of:
a mapping relationship between a number of TBs that is less than a second threshold and a resource configuration mode for resource scheduling on a first resource set; and
a mapping relationship between a number of TBs that is equal to or greater than a second threshold and a resource configuration mode for resource scheduling on a second resource set;
wherein, a number of resource combination modes in the second resource set is smaller than a number of resource combination modes in the first resource set.

16. The communication device as claimed in claim 11, wherein the mapping relationship comprises:
a mapping relationship between the number of TBs and a first indication state of the NDIs, wherein the first indication state is for indicating that each of the TBs is in a new transmission state;
or,
a mapping relationship between the number of TBs and a second indication state of the NDIs, wherein the second indication state is for indicating that each of the TBs is in a retransmission state.

* * * * *